Patented Oct. 16, 1934

1,977,577

UNITED STATES PATENT OFFICE 1,977,577

PROCESS OF HEAT TREATING PIGMENTS AND PRODUCT THEREOF

Chester C. Feagley, Philadelphia, Pa., assignor, by mesne assignments, to Krebs Pigment & Color Corporation, Wilmington, Del., a corporation of Delaware No Drawing. Application April 22, 1931, Serial No. 532,135

17 Claims. (Cl. 134—78)

In the production of pigments, the pigmenting material is ordinarily produced in finely divided, substantially insoluble form, as by precipitation, and thereafter subjected to calcination. While some reaction may take place during this latter step, in some cases such as in the treatment of lithopone, its effect appears primarily to be physical in changing the nature of the particles.

My invention is based upon the discovery that if the substantially insoluble pigment is subjected to high temperatures and pressures in the presence of moisture, effects are produced which in many respects are different from those produced by the ordinary calcination. According to experience, such effects are more or less noticeable with a large number of pigments, though their commercial value for presently known purposes may vary with the nature of the pigment. In some instances, the process of my invention may entirely replace calcination, where in other instances it does not produce just the same results as calcination, though giving desirable qualities to the pigments. The process set forth in this application is in part derived from my earlier application, Serial No. 222,936, filed September 29, 1927, and therefore this application is in part a continuation of said earlier application.

Of course, the process is not applicable to those pigments which will decompose at the elevated temperatures used but these pigments are substantially all organic or are of the border line class that contain the CN radical, and as far as my experience has gone, my process is applicable to all substantially insoluble, inorganic pigments (if that term is used as excluding the cyanides) and may be applied more or less advantageously to all substantially insoluble pigments of a type adapted to be treated by calcination. The most important group of pigments for which the process is applicable are the whites, substantially all of which fall in the above category, such for example as lithopone or zinc sulphide, titanium oxide, zinc oxide or the like. In fact, the process may generally be said to be applicable to oxide and sulphide pigments whether white, such as the examples given above, or colored as in the case of chrome or iron oxide or cadmium sulphide. However, other types of material falling in the general category can advantageously be treated as for example the titanates, particularly the alkaline earth metal titanates such as barium titanate; and of course the materials of the classes stated may be mixed or combined with other materials that may act only as extenders or it may be possible to combine material of two of the above classes.

In carrying out the invention, the finely divided pigment is subjected to high temperatures and pressures in the presence of moisture, and I find that during at least a part of the temperature range this moisture or part of it should be in the water phase. The temperature may range from about 200° C. to 450° C. or higher, thus carrying the temperature above the critical point of water into the zone where the moisture will exist only in the vapor phase. However, for some uses of this process, I advise that the temperature should not be carried above about 500° C. At 200° C. the development is slow, but can be carried on with reasonable commercial economy at temperatures above 250° C. The pressure range may be from 215 pounds (gauge) pressure up to pressures in excess of 6000 pounds. There is no reason to believe that there is any particular upper limit to the pressure that may be used except the expense of apparatus therefor. Ordinarily, it will be found advisable to use a pressure in the order of the pressure corresponding to that of saturated steam at the given temperature, but I do not wish to limit my process to an exact equivalency, for while water in the liquid phase must be present for the lower temperature ranges, the temperature may be carried to the point where all the water is vaporized, ultimately producing superheated steam below the critical temperature, or, as stated, the temperature may be carried up above the critical temperature of water. However, it is to be noted that in each case the water is present in a mass, per unit volume of space not occupied by solids, substantially greater than the mass, per unit volume, of saturated steam at 215 pounds pressure. When this limitation is met the top limits of temperature appear to be relatively unimportant except for the purposes of economy and to remain below the sintering point. Excess pressures produced by outside force do not in any way interfere with the operativeness of the process.

The time necessary for the treatment will depend somewhat on the temperature and pressure used. When the temperatures and pressures are within the lower range, from two to five hours may be necessary; whereas, at high temperatures and pressures, beneficial results with some pigments may be obtained in a relatively short time such as between 5 and 15 minutes. A preferred range of temperature is between 275° and 450° C., and for zinc sulphide and lithopone between 310° and 360° C. Within this latter temperature range and at least a corresponding steam pressure so that some water is present in the liquid phase, the time of treatment for zinc sulphide for example will ordinarily range from about ten to fifty minutes. Extending the time of treatment is costly but ordinarily does no apparent harm to the product.

The pigment particles may be introduced into the autoclave in the dry state and treated with saturated steam which initially will condense and moisten the material, but ordinarily it will be found advisable to prepare the pigment in a subdivided, moist state as by precipitation in the presence of water, and then without drying, subject it to heat. If this is done in a closed vessel, the water in the pigment should be sufficient both to generate the necessary pressure and maintain the desired concentration of water, thus making the operation a relatively simple one. For use in the production of lithopone, I may, for example, heat the wet precipitated material in an autoclave to a steam pressure of between 600 and 3500 pounds per square inch. Under these conditions, the precipitate undergoes certain changes in its physical structure which aparently are different from those changes which take place when a similar precipitate is calcined at higher temperatures and without super-atmospheric pressures.

It is generally believed that the calcination of pigments improves them by causing some increase in the average particle or crystal size which is accompanied by a great increase in the pigmenting strength over the raw precipitate. One of the drawbacks to calcination is that it has been found that in order to be even moderately effective to give satisfactory commercial strengths for use in pigments and the like, the calcination must be conducted at temperatures of 600° C. or higher, temperatures over 700° C. being customary. Unfortunately at these temperature some sintering of the particles invariably takes place, so that a freshly calcined pigment is harsh and gritty and must be subjected to a wet grinding. Even with this step included, it is commercially impossible entirely to break down the sintered aggregates. By my process, using relatively low temperatures, I am able to produce a pigment adequately heat-treated to give pigmenting strength for paints and the like, which immediately after the heat treatment is soft and smooth and free from sintered aggregates or other injurious effects of temperatures above 500° C., and can be used for purposes demanding a particularly even product, such as enamel paints. Ordinarily it will be advisable to dry out the water (with a preliminary washing to remove water soluble bodies where present in any substantial quantities) and this step of drying may cause some caking, but this is very different from the effects of sintering and the caked lumps can be readily broken up by a simple crushing.

What I claim is:

1. The process of treating pigments to change the pigmenting qualities thereof which comprises subjecting a substantially insoluble, inorganic pigment in the presence of water to the combined action of heat and pressure, the pressure ranging above 215 pounds but not above about 6000 pounds and the temperature ranging above 200° C. but not above about 500° C.

2. In the art of preparing pigments, the step of treating a substantially insoluble pigment, of a type adapted to be improved by calcination, at a temperature above 250° C. in the presence of moisture present in a mass, per unit volume of space not occupied by solids, substantially greater than the mass, per unit volume, of saturated steam at 215 pounds pressure.

3. The process of treating pigments to change the pigmenting qualities thereof which comprises heating a quantity of a substantially insoluble, inorganic pigment in the presence of water to a temperature of between 250° C. and the critical temperature of water while maintaining for from 5 minutes to 2 hours a pressure substantially as great as the pressure of saturated steam at the same temperature.

4. In the art of preparing pigments, the steps of heating a substantially insoluble, inorganic pigment material together with water in the liquid phase to a high temperature and during such heating maintaining the material for more than 5 minutes at a temperature between 200° C. and the critical temperature of water while maintaining a sufficient pressure during such portion of the heating period to hold a part of such water in the liquid phase.

5. The process as specified in claim 4, in which during the treatment of the material, a temperature is reached above the critical temperature of water.

6. The process of treating a pigment comprising zinc sulphide which comprises subjecting such pigment together with water to a temperature of between 310° to 360° C. and a pressure at least as great as the corresponding pressure of saturated steam for from 5 to 50 minutes.

7. The process of treating lithopone which comprises subjecting precipitated lithopone together with water to a temperature of between 310° and 360° C. while maintaining the pressure at least as great as the corresponding pressure of saturated steam and continuing such treatment for from 5 to 50 minutes.

8. As a new product, a heat treated pigment of satisfactory pigmenting strength for use in paints and the like resulting from a treatment in the presence of water at a temperature above 200° C. and a pressure above 215 pounds, free from the effects of temperatures ranging substantially above 500° C.

9. A new product consisting of a heat treated pigment resulting from a treatment in the presence of water at a temperature above 200° C. and a pressure above 215 pounds, which immediately after such heat treatment is smooth and soft and consists of particles of a size fit for use in paints and the like without the necesity of grinding.

10. An uncalcined heat treated pigment produced by a treatment in the presence of water and steam at a pressure above 215 pounds and a temperature of between 250° C. and 450° C.

11. As a new product, a heat treated pigment of satisfactory pigmenting strength for use in paints and the like produced by a heat treatment in the presence of water at a pressure of at least 215 pounds and a temperature above 200° C. but below 500° C.

12. As a new product, a finished lithopone of satisfactory commercial strength produced by a heat treatment in the presence of water at a temperature above 200° C. but below 500° C. and at a pressure of at least 215 lbs.

13. A finished lithopone pigment which has been steam treated without calcination at a temperature below 450° C. and at a pressure of at least 215 lbs.

14. A finished lithopone pigment of the type normally requiring calcination which has been subjected to a treatment in the presence of water and steam at a pressure of at least 600 pounds but has not been subjected to a temperature above that of steam raised in a closed container containing water to a pressure of 3500 pounds.

15. A process of treating a lithopone pigment comprising precipitating it and treating it in the presence of water and steam at a pressure of from 600 to 3500 pounds.

16. A process of treating a lithophone pigment comprising precipitating a zinc sulphate and a barium sulphide solution to form lithopone and treating the latter with steam in the presence of water at a pressure of between about 600 and about 3500 pounds.

17. The process of treating pigments to change the pigmenting qualities thereof which comprises subjecting a substantially insoluble, inorganic pigment in the presence of water to the combined action of heat and pressure, the pressure ranging above 215 pounds, and the temperature approximating that of saturated steam at the prevailing pressure.

CHESTER C. FEAGLEY.